July 14, 1953   J. N. BOGAARDS   2,645,212
TEMPERATURE CONTROL FOR INTERNAL-COMBUSTION ENGINES
Filed April 6, 1951

INVENTOR
JACOB NICOLAAS BOGAARDS

ATTORNEYS

Patented July 14, 1953

2,645,212

UNITED STATES PATENT OFFICE 2,645,212

TEMPERATURE CONTROL FOR INTERNAL-COMBUSTION ENGINES

Jacob Nicolaas Bogaards, The Hague, Netherlands, assignor of one-half to Hindrik Jacob Hoving, Groningen, Netherlands Application April 6, 1951, Serial No. 219,578
In the Netherlands April 6, 1950

3 Claims. (Cl. 123—41.06)

The invention relates to an apparatus for defining the upper as well as the lower limit of the temperature of the cooling water of an internal combustion engine, in particular of a motorcar engine.

The system of water cooling usually adopted in motorcar engines involves many drawbacks, especially in winter. Owing to the low temperature of the air the engine, when stopped, will cool down too much, and thus there is often a danger that the cooling water in the engine will freeze, which may cause cracks in the block, while the starting of the engine becomes difficult owing to the low temperature.

It is known to prevent the danger of freezing by adding anti-freeze agents to the cooling water. These anti-freeze agents, however, have many drawbacks, since they tend, among other things, to attack the rubber tubes, and may cause leakage and choking.

In winter, when the car is travelling along, the engine will cool down too much, so that its temperature will not become sufficiently high, with all the disadvantages this entails.

It is known to counteract this excessive cooling by providing in front of the radiator a roller-blind which is operated by the driver of the car during driving. Shutters operated by a thermostat disposed in the radiator are also known. If the temperature of the cooling water becomes too high during driving, the roller-blind is opened by the driver or the shutter by the thermostat.

It is also known to prevent the freezing of the cooling water in a garaged motorcar by disposing in the cooling system a heating element adapted to be connected with the electric supply of the building.

If, on the other hand, the temperature of the cooling water becomes too high, this may also have harmful consequences. In fact, when the boiling point is reached, steam bubbles are formed, which may result in local superheating and damage to the engine. This might happen, for example, if the roller-blind to be operated by the driver remains shut for too long a time, and it is particularly harmful if the quantity of cooling water is not sufficient.

The invention has for its object to provide an apparatus by means of which the temperature of the cooling water is automatically maintained within certain limits.

This apparatus is a combination of a heating element disposed in the cooling system and adapted to be connected with the battery of the car, a roller-blind or shutter arranged in front of the radiator, and a temperature-responsive device which is so designed that if the temperature of the cooling water falls below a given minimum value, the circuit of the heating element is closed, while the said circuit puts into operation a vacuum device which opens the roller-blind or shutter if a given maximum temperature of the cooling water is exceeded, and stops the engine if the temperature has become dangerously high.

This apparatus is preferably so designed that the temperature-responsive device contains a gaseous liquid medium, which under the influence of the temperature of the cooling water acts on a spring-actuated piston, which operates the contacts of the circuit for the heating element, controls the conduit (for the operation of the roller-blind) leading from the intake manifold of the engine to the vacuum device, and operates a contact by means of which the ignition circuit of the engine is interrupted as soon as a dangerously high temperature is reached.

The apparatus according to the invention operates as follows:

When the engine is stopped and cooled, the piston of the temperature-responsive device is in its lowest position, and in this position the circuit to the heating element is closed, while the heat supplied to the cooling system is sufficient to prevent the freezing of the cooling water and to maintain a temperature at which the starting of the engine is facilitated. In this position the roller-blind (or shutter) is kept shut by means of a spring.

When the engine is started and the temperature rises, the piston moving upwards under the influence of the expanding gaseous or liquid medium will first of all interrupt the circuit of the heating element by means of a suitable contact device. However, the roller-blind will remain shut, as a result of which the temperature of the engine will rapidly rise.

If the temperature of the cooling water rises beyond a given maximum value, the piston (which is appropriately shaped for the purpose) continuing its upward movement will open the vacuum conduit to the vacuum device, as a result of which the roller-blind (or shutter) is opened. If, owing to special circumstances, the temperature should still rise too much (for example because the quantity of cooling water is not sufficient), a second contact to be operated by the piston of the temperature-responsive device can ensure the interruption of the ignition circuit, as a result of which the engine is stopped.

When at the end of the drive the car is garaged or parked, the elimination of the vacuum will first of all cause the roller-blind to be immediately shut by the spring, so that unnecessary loss of heat is prevented.

If after a considerable time the temperature of the cooling water falls below a given minimum value (for example 20° C.), the piston of the temperature-responsive device will close the contact in the circuit of the heating element again, while the heat supplied by the heating element connected with the battery will be sufficient to prevent the freezing of the cooling water.

In this way a completely automatically operating safety device is obtained, which is of particular importance in the colder seasons.

In order to prevent unnecessary operation during the warmer season, means can be provided for putting parts of the apparatus out of operation: for example the roller-blind may be blocked in the opened position, the circuit of the heating element may be permanently interrupted by another contact. But even in this season use may always be made of the final safety device, i. e. the interruption of the ignition circuit when a maximum temperature is exceeded.

In the annexed drawing, an embodiment of the apparatus according to the invention is illustrated by way of example.

Figure 1:
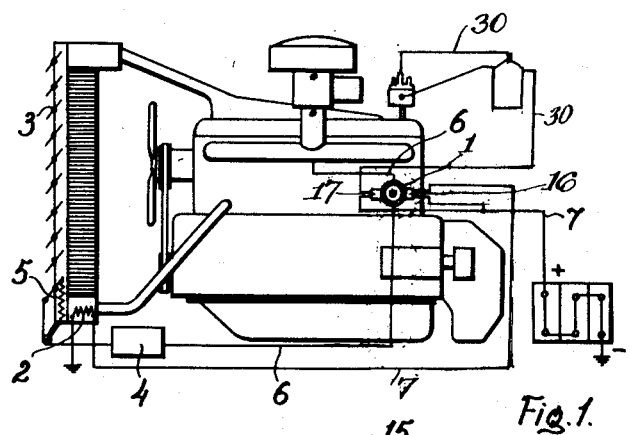
Fig. 1 is a diagram showing how the apparatus according to the invention may be disposed.

Fig. 1 shows a diagram of an internal combustion engine with a cooler for a motorcar. The numeral 1 designates the temperature-responsive device, 2 is the heating element which is adapted to be connected with the battery and which is here drawn in the lower tank of the radiator, but may also be disposed in some other suitable place, for example in the water supply line to and immediately in front of the engine block. The numeral 3 designates a shutter, which can be opened by a vacuum device 4 against the action of the spring 5. The vacuum conduits are designated by 6, the electric conductors by 7.

Figure 2:
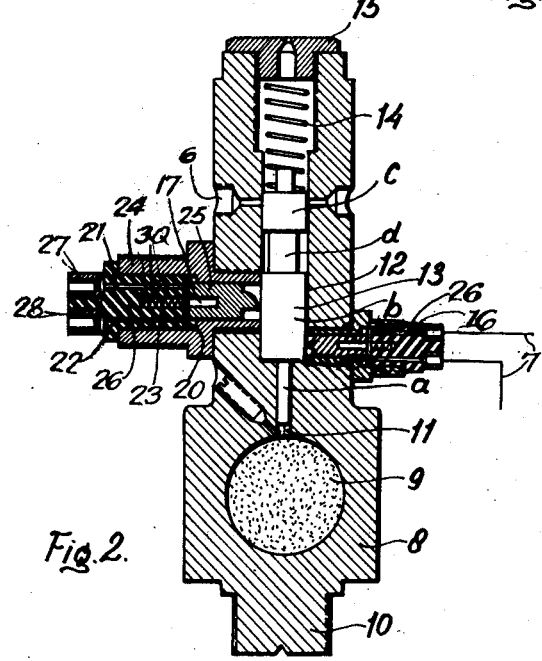
Fig. 2 illustrates an embodiment of the temperature-responsive device.

Fig. 2 shows the temperature-responsive device. In this drawing, 8 is the casing, which comprises a spherical (or differently shaped) cavity 9 for holding the gaseous or liquid medium, which expands or contracts under the influence of the temperature. The casing 8 is secured in the cooling system by means of a plug 10 in a suitable place, for example in the cooling jacket of the engine block. Above the cavity 9 there is a cylindrical bore 11 of a small diameter, which ends in a similar bore of a larger diameter.

In these bores there is a piston 13, which consists of a portion, $a$, fitting into the small bore, two portions, $b$ and $c$, fitting into the larger bore, and a portion, $d$, with a smaller diameter in between the said portions $b$ and $c$. Above the piston there is a spring 14 which forces the piston in the direction of the cavity. The spring rests against a threaded plug 15.

The portion $b$ of the piston 13 operates a mechanism 16, by means of which the contact in the circuit of the heating element is closed or interrupted. This portion $b$ may also operate a second contact 17, by means of which the ignition circuit can be interrupted. Under normal circumstances the portion $c$ of the piston 13 shuts off the vacuum conduit 6. When the piston moves upwards, the portion $c$ will at a given moment unblock the vacuum conduit, as a result of which a continuous connection is formed via the cylindrical cavity round the portion $d$ of the piston.

The contact devices 16 and 17, as shown are substantially identical and operate in a similar way so that only the device 17 will be described in detail. This device 17 comprises a tubular housing 24 containing the slidable cam 25 at the inner end and the insulating plug 26 at the outer end. The insulating plug includes two conducting elements 21 and 22 embedded therein running lengthwise thereof. The plug 26 also contains an opening 23 in which a spring 30 is positioned. Between the plug 26 and the cam 25 a conducting plate 20 is positioned whereby the two lines attached to caps 27 and 28 are connected by means of conductor 21, plate 20 and conductor 22 when the cam plug 25 is in the position shown in Fig. 2. If plug 25 however is allowed to move inwardly, the spring 30 will push the element 20 and plug 25 away from contact with elements 21 and 22 and will therefore disestablish the connection between the battery and the ignition system to which cap 27 is connected.

This apparatus operates as follows. If the temperature rises, the piston 13 moves upwards in the cylinder bore, and the circuit of the heating element is interrupted by the mechanism 16 moving inwards under the influence of a spring (not shown).

When the piston returns, the circuit is closed again by the said mechanism, the lower limit of the temperature of the cooling water thus being defined.

If the temperature rises beyond a given maximum, the portion $c$ will unblock the vacuum conduit and thus open the roller-blind or shutter by means of the vacuum device. If the temperature rises even more, the portion $b$ can open the contact 17, the ignition circuit thus being interrupted and the engine being stopped.

If the engine is stopped, the roller-blind or shutter will always be closed by means of its spring through the elimination of the vacuum, irrespective of the position of the piston.

What I claim is:

1. Apparatus for defining the upper as well as the lower limit of the temperature of the cooling water of an internal combustion engine, in particular of the internal combustion engine of a motorcar, characterized in that it comprises in combination a heating element disposed in the cooling system and adapted to be connected with the battery of the motorcar, a roller-blind or shutter arranged in front of the radiator, and a temperature-responsive device of such a design that if the temperature of the cooling water falls below a given minimum value, the circuit of the heating element is closed and puts into operation a vacuum device which opens the roller-blind or shutter if the temperature of the cooling water exceeds a given maximum, and stops the engine if the temperature becomes dangerously high.

2. Apparatus according to claim 1, characterized in that the temperature-responsive device contains a gaseous or liquid medium acting, under the influence of the temperature of the cooling water, on a spring-actuated piston, which operates the contacts of the circuit for the heating element, controls the conduit for the operation of the roller-blind leading from the intake manifold of the engine to the vacuum device, and operates a contact by means of which the ignition circuit of the engine is interrupted as soon as a dangerously high temperature is reached.

3. Apparatus for defining the upper as well as the lower limit of the temperature of the cooling water of an internal combustion engine which includes a vacuum line, and has a battery associated therewith, comprising in combination, a heating element disposed in the cooling system and adapted to be connected with the battery, a vacuum operated roller-blind or shutter, spring means normally holding said roller-blind or shutter in closed position, a temperature responsive device including a first means for closing the circuit of said heating element when the temperature of said cooling water falls below a predetermined minimum value, said temperature responsive device including a second means for connecting the vacuum line of said engine to open said roller-blind or shutter when the temperature of the cooling water reaches a predetermined higher temperature, and said temperature responsive device including a third means adapted to stop the engine if the said engine reaches a dangerously high temperature.

JACOB NICOLAAS BOGAARDS.

References Cited in the file of this patent

UNITED STATES PATENTS

| Number | Name | Date |
| --- | --- | --- |
| 1,523,541 | Irving | Jan. 20, 1925 |
| 1,652,736 | Schwalbenberg | Dec. 13, 1927 |

FOREIGN PATENTS

| Number | Country | Date |
| --- | --- | --- |
| 282,977 | Great Britain | Jan. 5, 1928 |